US012723506B2

(12) United States Patent
Hillman

(10) Patent No.: US 12,723,506 B2
(45) Date of Patent: Sep. 1, 2026

(54) LOCALIZING A TOOL IN A TUBULAR CONDUIT

(71) Applicant: Saudi Arabian Oil Company, Dhahran (SA)

(72) Inventor: Thomas Hillman, Missouri City, TX (US)

(73) Assignee: Saudi Arabian Oil Company, Dhahran (SA)

( * ) Notice: Subject to any disclaimer, the term of this patent is extended or adjusted under 35 U.S.C. 154(b) by 297 days.

(21) Appl. No.: 18/642,512

(22) Filed: Apr. 22, 2024

(65) Prior Publication Data

US 2025/0382871 A1 Dec. 18, 2025

(51) Int. Cl.
*E21B 47/092* (2012.01)
*G01N 27/82* (2006.01)

(52) U.S. Cl.
CPC ......... *E21B 47/092* (2020.05); *G01N 27/825* (2013.01)

(58) Field of Classification Search
CPC ...... G01M 3/005; E21B 47/092; E21B 47/09; G01N 27/825
USPC .......................................................... 324/346
See application file for complete search history.

(56) References Cited

U.S. PATENT DOCUMENTS 3,543,144 A * 11/1970 Walters .............. G01N 27/9093 324/221
7,708,067 B2 5/2010 Treviranus et al.
7,795,864 B2 * 9/2010 Barolak ................ E21B 47/006 324/228
12,352,121 B1 7/2025 Hillman
2021/0017827 A1 1/2021 Seren et al.
2022/0243583 A1 * 8/2022 Seren .................... E21B 47/092
2023/0194404 A1 6/2023 Hillman et al.

FOREIGN PATENT DOCUMENTS

FR 2757950 A1 * 7/1998 ............. G01L 1/086
GB 2429254 A * 2/2007 ........... G01N 27/825
KR 20180060775 A * 6/2018 ........... G01N 27/825

* cited by examiner

*Primary Examiner* — Christopher E Mahoney
(74) *Attorney, Agent, or Firm* — Fish & Richardson P.C.

(57) ABSTRACT

A pipeline tool includes a body, a magnet disposed at the body, one or more sensors disposed at the body, and a controller disposed at the body. The one or more sensors measure at least one force of attraction generated between the magnet and a ferromagnetic material of a tubular conduit. The controller performs operations which include determining, based on the force of attraction, a position of the pipeline tool within a cross-section of the tubular conduit relative to a wall of the tubular conduit within the cross-section.

20 Claims, 7 Drawing Sheets

LOCALIZING A TOOL IN A TUBULAR CONDUIT

TECHNICAL FIELD

The present disclosure relates to a wellbore or a piped conduit and more specifically, to determining a location of a tool, such as a downhole tool or any pipeline tool within a tubular conduit, such as a pipe or a pipe within a wellbore.

BACKGROUND

For the purposes of autonomous navigation and measurement by a tool or vehicle within a pipeline, on the surface or within a piped wellbore, it is often useful and sometimes necessary to know where the tool or vehicle is within the pipe crossection or how it is oriented relative to the surrounding conduit.

SUMMARY

In an example implementation, a pipeline tool includes a body; a magnet disposed at the body; one or more sensors disposed at the body and configured to measure at least one force of attraction generated between the magnet and a ferromagnetic material of a tubular conduit; and a controller disposed at the body and configured to perform operations including determining, based on the force of attraction, a position of the pipeline tool within a cross-section of the tubular conduit relative to a wall of the tubular conduit within the cross-section.

In an aspect combinable with the example implementation, the magnet and the controller are detachably mounted to the body.

In another aspect combinable with one, some, or all of the previous aspects, the one or more sensors is configured to measure the force of attraction in a plurality of directions.

In another aspect combinable with one, some, or all of the previous aspects, the operations include determining the position of the pipeline tool based on the force of attraction in the plurality of directions.

In another aspect combinable with one, some, or all of the previous aspects, the operation of determining the position of the pipeline tool includes determining, based on the force of attraction, a distance of the body from a radial surface of the tubular conduit.

In another aspect combinable with one, some, or all of the previous aspects, the operation of determining the position of the pipeline tool includes determining, based on a correlation of (i) the force of attraction, (ii) a radius of the cross-section, and (iii) a type of the magnet, a distance of the body from a radial surface of the tubular conduit.

In another aspect combinable with one, some, or all of the previous aspects, the operation of determining the distance of the body from the radial surface of the tubular conduit includes determining, based on an equation: $F=c/d^2$, the distance of the body from the radial surface of the tubular conduit. F corresponds to the force of attraction, c corresponds to a coupling constant correlated with at least the type of the magnet and the radius of the cross-section, and d corresponds to the distance of the body from the radial surface of the tubular conduit.

In another aspect combinable with one, some, or all of the previous aspects, the position of the pipeline tool corresponds to an x-y coordinate of the cross-section.

In another aspect combinable with one, some, or all of the previous aspects, the operations include determining, based on the force of attraction, a corrosion at a particular location of the tubular conduit.

In another aspect combinable with one, some, or all of the previous aspects, the operation of determining the corrosion includes determining, based on the pipeline tool traversing within the tubular conduit, a discrepancy of the force of attraction over a time period.

In another aspect combinable with one, some, or all of the previous aspects, the operation of determining the discrepancy of the force of attraction over the time period includes plotting a graph of force relative to at least one of (i) a vertical position of the pipeline tool within the tubular conduit or (ii) a time.

In another aspect combinable with one, some, or all of the previous aspects, the operations include communicating data with a control system located outside the tubular conduit, the control system configured to output a warning responsive to determination of the corrosion.

In another example implementation, a method includes measuring, by a pipeline tool equipped with a magnet and one or more sensors, at least one force of attraction generated between the magnet and ferromagnetic material of a tubular conduit; and determining, based on the force of attraction and by the pipeline tool, a position of the pipeline tool within a cross-section of the tubular conduit relative to a wall of the tubular conduit within the cross-section.

In an aspect combinable with the example implementation, the one or more sensors is configured to measure the force of attraction in a plurality of directions.

In another aspect combinable with one, some, or all of the previous aspects, determining the position of the pipeline tool includes determining the position based on the force of attraction in the plurality of directions.

In another aspect combinable with one, some, or all of the previous aspects, determining the position of the pipeline tool includes determining, based on the force of attraction, a distance of the pipeline tool from a radial surface of the tubular conduit.

In another aspect combinable with one, some, or all of the previous aspects, determining the position of the pipeline tool includes determining, based on a correlation of (i) the force of attraction, (ii) a radius of the cross-section, and (iii) a type of the magnet, a distance of the pipeline tool from a radial surface of the tubular conduit.

In another aspect combinable with one, some, or all of the previous aspects, determining the distance of the pipeline tool from the radial surface of the tubular conduit includes determining, based on an equation $F=c/d^2$, the distance of the pipeline tool from the radial surface of the tubular conduit. F corresponds to the force of attraction, c corresponds to coupling constant correlated with at least the type of the magnet and the radius of the cross-section, and d corresponds to the distance of the pipeline tool from the radial surface of the tubular conduit.

In another aspect combinable with one, some, or all of the previous aspects, the position of the pipeline tool corresponds to an x-y coordinate of the cross-section.

Another aspect combinable with one, some, or all of the previous aspects includes determining, based on the force of attraction and by the pipeline tool, a corrosion at a particular location of the tubular conduit.

In another aspect combinable with one, some, or all of the previous aspects, determining the corrosion includes based on the pipeline tool traversing within the tubular conduit, determining a discrepancy of the force of attraction over a time period.

In another aspect combinable with one, some, or all of the previous aspects, determining the discrepancy of the force of attraction includes plotting a graph of force relative to a vertical position of the pipeline tool within the tubular conduit or time.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
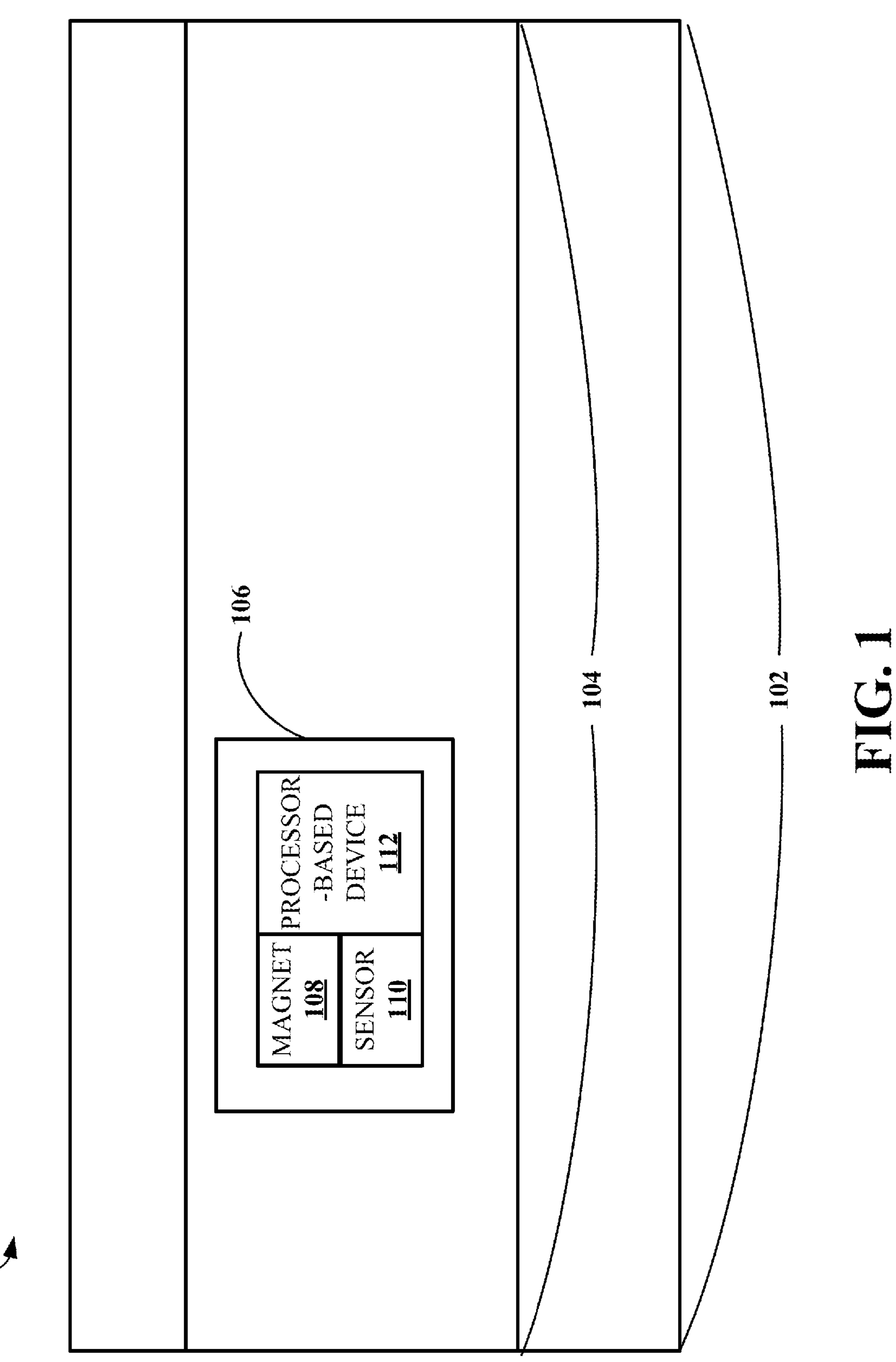
FIG. 1 is a schematic diagram of an example of a system for determining a position of a pipeline tool or a corrosion within a wellbore tubular or a pipe.

Determining a precise cross-sectional location of a pipeline tool (for example, a downhole tool or above-ground pipeline tool) within a tubular, such as a wellbore (for example, having a wellbore tubular or not) or pipeline has been a challenge in an oil and energy industry. Existing methods typically rely on demanding and complex technologies such as ultrasonic sensors, gamma-ray imaging, and magnetic imaging. These methods require specialized equipment, highly skilled personnel, and significant time and resources, making them impractical for widespread use, and unsuitable for use within the wellbore for example. Moreover, these methods attempt to locate the object (for example, the pipeline tool) inside the pipe using the equipment on the outside of the pipe.

There are even fewer options when an autonomous pipeline tool is attempted to be used to detect the cross-sectional location of the object within the wellbore tubular or the pipe, because such pipeline tool would be surrounded by fluids within the wellbore tubular or the pipe (for example, tubular conduit). For example, optical solutions can be impractical because the fluids can blind the optics. Hall effect sensors can only work in one direction and have a very limited range (up to 1" approximately), so bulky polar array of these sensors is needed, and capacitive and resistive sensors require a high-power source to constantly bleed energy into the surrounding fluid and metalwork. As such, a low power pipeline tool that can sense the inner surface of the pipe in multiple directions irrespective of a pipeline tool orientation is in need.

Further, detecting damages, such as corrosion, within the wellbore tubular or the pipe can involve using x-ray imaging and machine learning algorithms on heat map images, but these techniques are complicated to use and require significant resources.

Implementations described in this disclosure provides system and method for addressing the issues addressed above. For example, a magnet, one or more sensors, and a processor-based device can be disposed at or mounted to a body (for example, a carrier) of a pipeline tool. When forces of attraction are generated between the magnet and ferromagnetic material of a pipe within the wellbore, the one or more sensors can measure such forces of attraction. For example, the one or more sensors can measure forces of attraction in multiple directions. For example, the processor-based device can determine, based on the forces of attraction, a position of the pipeline tool within a cross-section of the pipe relative to a wall of the pipe within the cross-section.

Moreover, the processor-based device can be configured to, based on the forces of attraction, determine the damage (for example, corrosion) at the pipe. For example, the body can be one of a vehicle, a tractor, or a pipe pig that are configured to be used within the wellbore, and when the pipeline tool traverses within the wellbore, the processor-based device of the pipeline tool can determine a discrepancy of the forces of attraction over a time period to determine the damages at the pipe.

Accordingly, determining the position of the pipeline tool accurately within the cross-section of the pipe and determining the damages at the pipe lead to more efficient and effective oil and gas exploration and production. For example, drilling operation can be optimized, by detecting wellbore obstruction, ensuring proper placement of the pipeline tool or drilling tool, and accurately monitoring an integrity of the well based on the pipeline tool without complex equipment or specialized training. Moreover, for example, such position determination can be used to prevent a drag of the pipeline tool against a wellbore tubular such as a well casing or to centralize the pipeline tool to reduce viscous forces. Moreover, for example, such damage detection can identify potential issues such as corrosion and leaks. Moreover, for example, as the pipeline tool can be deployed in real-time, real-time position detection and real-time damage detection allow for more efficient and expedited decision-making. Moreover, knowing the orientation of the pipeline tool can help aligning data from the measurement systems to a frame of reference oriented along the axis of the pipe. For example, if a magnetometer or accelerometer is used, which can measure or provide three or more axes of magnetic field strength or acceleration (respectively), these axes can be transformed to align with the pipe using the orientation of the tool relative to the pipe.

FIG. 1 is a schematic diagram of an example of a system 100 for determining a location of a pipeline tool or a damage (for example, pipe corrosion) within a wellbore tubular or a pipe. The system 100 includes a wellbore 102, a wellbore tubular 104 (for example, a casing), and a pipeline tool 106 (for example, a carrier). The pipeline tool 106 includes a magnet 108, one or more sensors 110, and a processor-based device 112.

The wellbore 102 can be connected or in fluid communication with a hydrocarbon (or mixed fluid) reservoir, and the wellbore tubular 104 can be disposed (for example, installed) within the wellbore 102. The wellbore tubular 104 can be made of metal or ferromagnetic material (for example, metal, steel, iron). In some implementations, another tubular (such as a production tubing or wellbore liner) that is made of the metal or the ferromagnetic material can be disposed within the wellbore tubular 104.

The pipeline tool 106 can be used to traverse inside the wellbore tubular 104 or the pipe and determine the position of the pipeline tool 106 within a cross-section of the wellbore tubular 104 or the pipe relative to a wall of the wellbore tubular 104 or the pipe within a cross-section of the wellbore tubular 104 or the pipe.

The pipeline tool 106 can be a tethered pipeline tool or an untethered pipeline tool. For example, the tethered pipeline tool (for example, carried on a downhole or other conveyance, such as a wireline) can be physically connected to a computing device outside of the wellbore, well, or over a ground surface (for example, land surface) through a cable that can transmit power, control signals, and data such that the tethered pipeline tool is in data communication with the outside computing device (for example, external computing device). For example, such outside computing device can control a movement of and receive data from the tethered pipeline tool. For example, such outside computing device can be the computing device 200 of FIG. 2.

Moreover, on the other hand, for example, the untethered pipeline tool (for example, wireless pipeline tool) can be wirelessly connected or in data communication with the outside device. For example, such outside computing device can control the movement of and receive data from the untethered pipeline tool.

For example, the pipeline tool 106 can be one of a vehicle (including both wheeled transportation and unwheeled transportation such as drone), a robot, a tractor, or a pipe pig that are configured to be used within the wellbore.

The magnet 108, the one or more sensors 110, and the processor-based device 112 can be attached to (for example, mounted on, integrated into, or detachably connected to) the pipeline tool 106. For example, the magnet 108 can be attached to the pipeline tool at one end of the pipeline tool, and the one or more sensors 110 can be attached to the pipeline tool at another end of the pipeline tool 106.

The magnet 108 can generate magnetic field and force(s) of attraction between the magnet 108 and the wellbore tubular 104 or the pipe. For example, the magnet 108 composed of high strength magnet material is preferred, as this allows for smaller size of the magnet 108 which could reduce signal noise due to vibrations and impacts. The one or more sensors 110 can be configured to measure such force(s) of attracted generated between the magnet 108 and the wellbore tubular 104 or the pipe. In some instances, the force(s) of attraction can be in multiple directions and the one or more sensors 110 can be configured to measure the force(s) of attraction in multiple directions. For example, the one or more sensors 110 can be a multi-axis force sensor that can detect or measure the force(s) of attraction or torque in multiple axis (for example, X, Y, and Z axes) or directions. In some implementations, in addition to the multi-axis force sensor, the one or more sensors 110 can further include an accelerometer to fully capture a motion of the pipeline tool 106 or identify a global z direction of forces of attraction based on a gravity pulling the magnet 108.

The processor-based device 112 can be a computing device (such as a computing device 200 shown in FIG. 2) including an end-user device, information appliances, mobile computers, handheld computers, cloud-based platform, distributed computing platform, and the like. The processor-based device 112 can be connected to (for example, wirelessly or wired) to the one or more sensors 110. The processor-based device 112 can include or run a software or an application for determining, based on the force(s) of attraction, (i) a position of the pipeline tool within a cross-section of the wellbore tubular 104 or the pipe relative to a wall of the wellbore tubular 104 or the pipe, and (ii) the damage or the corrosion at the wellbore tubular 104 or the pipe. For example, the wall can include or correspond to a radial surface of the pipe or the wellbore tubular.

For example, determining the position of the pipeline tool 106 can include determining, based on the force(s) of attraction, a distance from the pipeline tool (or component(s) thereof) to the wall of the wellbore tubular 104 or the pipe within the cross-section. For example, determining the position of the pipeline tool can include determining, based on following equation (1), the distance from the pipeline tool 106 to the wall.

$$F = \frac{c}{d^2} \tag{1}$$

In equation (1), F corresponds to the force of attraction, c corresponds to a coupling constant correlated with a type of the magnet 108 chosen and a radius of the wellbore tubular 104 or the pipe, and d correspond to the distance from the pipeline tool 106 (or component(s) thereof such as the magnet 108) to the wall. For example, the coupling constant can be determined empirically for standard pipe sizes for whichever magnet is chosen to be used. For example, this value can be calculated by experimentation and would be consistent for that pipe size and the magnet. The process can include placing the pipeline tool 106 within a pipe at the factory or lab and using the pipeline tool 106 to measure the forces at two or more known distances form the pipe wall. The coupling constant "c" can then be calculated from those measured forces and known distances.

Because size of the wellbore tubular 104 or the pipe varies, it can be necessary to use, choose, or derive a pre-determined value for the coupling constant, before immersing the pipeline tool 106 within the wellbore tubular 104 or the pipe, before measuring the force(s) of attraction, or before the processor-based device 112 determines the distance based on the force(s) of attraction. Based on the distance, the position of the pipeline tool 106 (or component (s) thereof) can be determined. For example, an x-y coordinate of the cross-section relative to the wall of the wellbore tubular 104 or the pipe within the cross section can be determined based on the distance.

Figure 5:
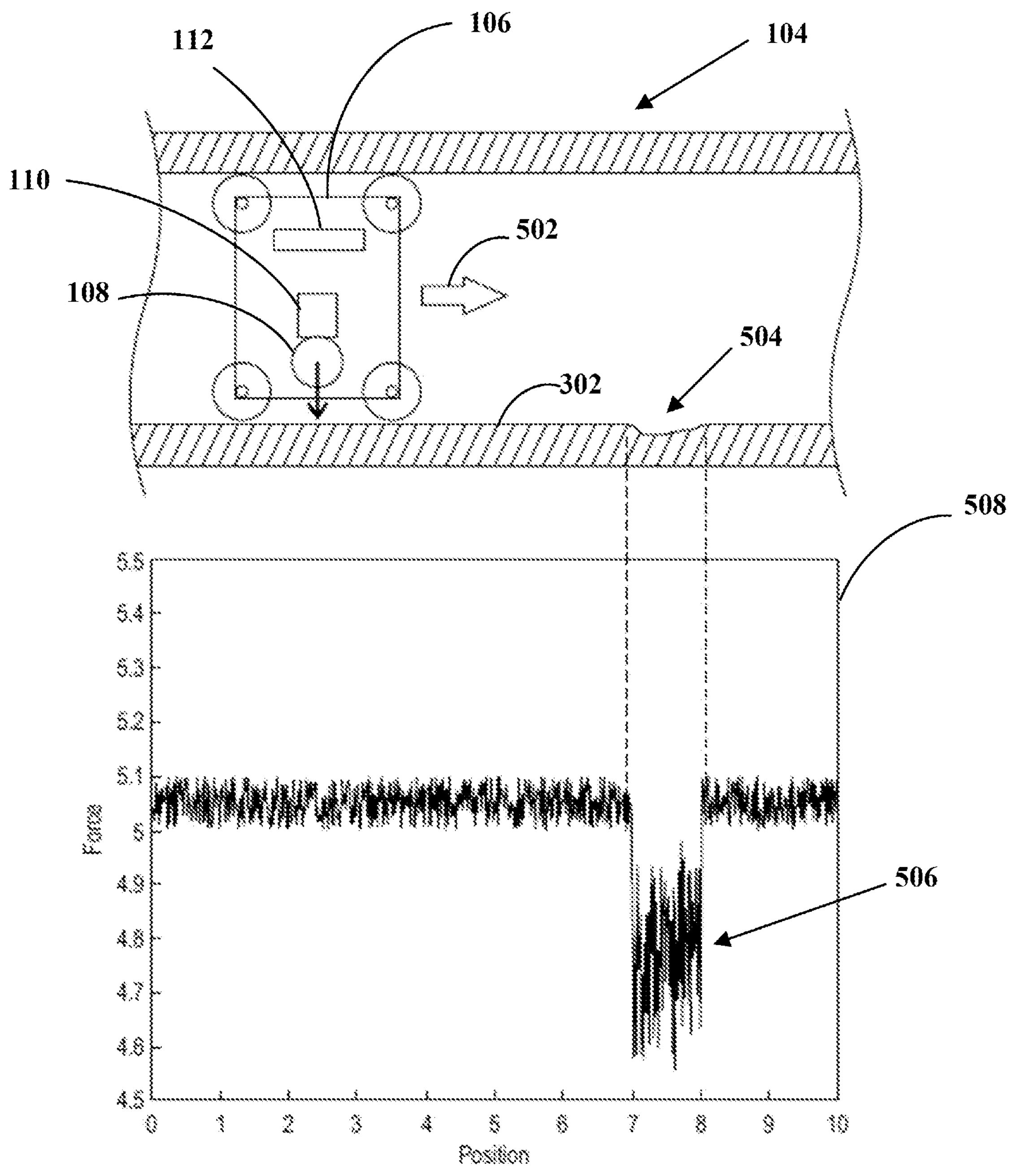
FIG. 5 depicts an example of determining of a corrosion at a wellbore tubular or a pipe.

Moreover, for example, determining the damage or the corrosion at the wellbore tubular 104 or the pipe includes, based on the pipeline tool 106 traversing within the wellbore, determining a discrepancy of the force of attraction over a time period. For example, as the pipeline tool 106 (for example, the pipe pig or the tractor) traverses or explores within the wellbore tubular 104 or the pipe over a certain time period, the magnet 108 can be kept within a specific cross-sectional location of, the wellbore tubular 104 or the pipe, over the certain time period, and the force(s) of attraction can remain constant with allowable level of deviation (for example, threshold deviation). Within the certain time period, if there is an indication that the force(s) of attraction falls outside the deviation threshold or noticeable changes or discrepancy is detected, such indication can correspond to the damage or the corrosion at the wellbore tubular 104 or the pipe. For example, such indication of discrepancy (for example, a discrepancy 506) is depicted in FIG. 5. Moreover, for example, in response to or after such indication is determined or detected, the processor-based device 112 or the outside device that is in data communication with the processor-based device 112 can generate a warning or an indication regarding the discrepancy, the damage, or the corrosion. In some implementations, such warning or the indication can be output to a display of the outside device.

Figure 2:
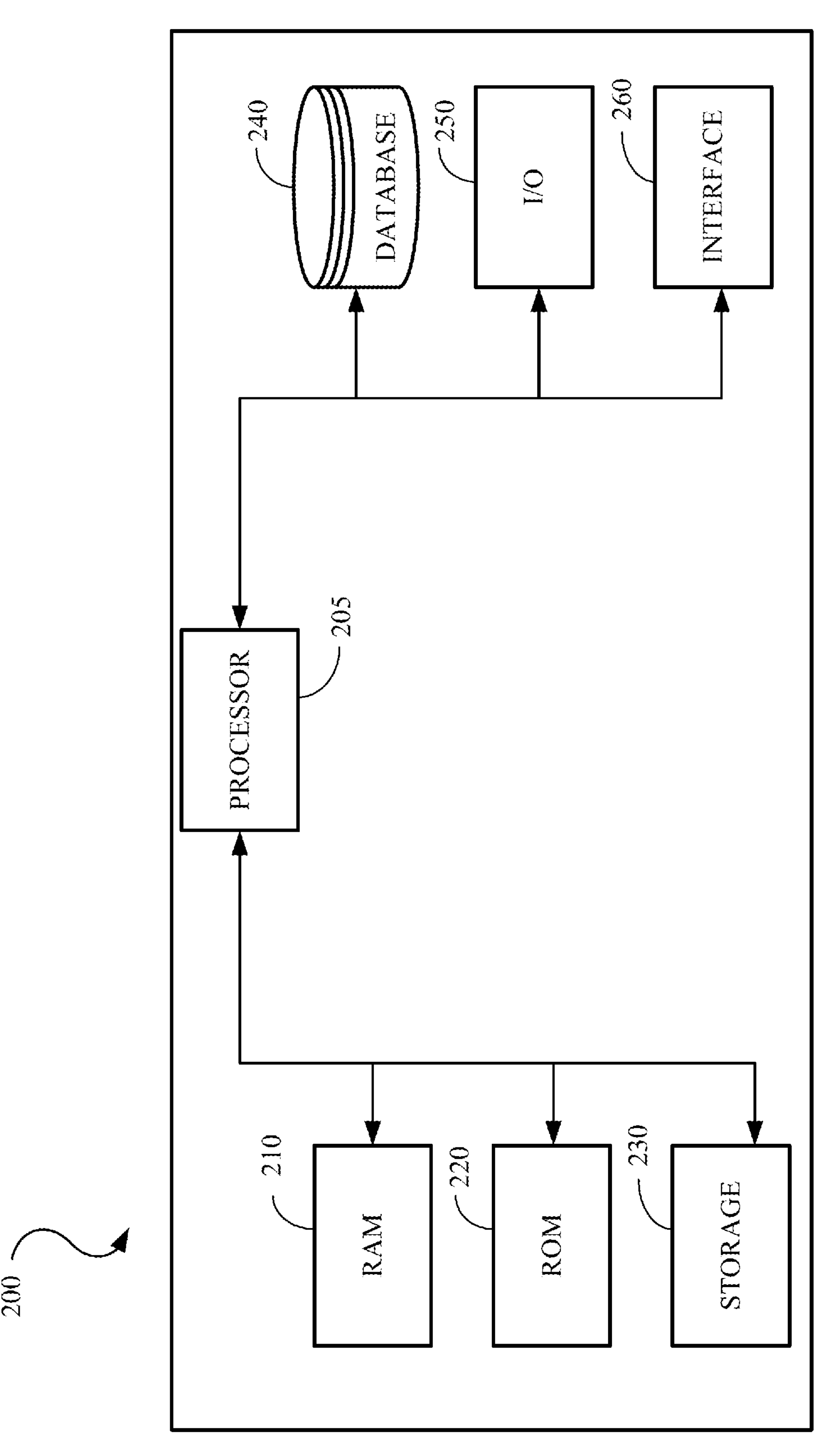
FIG. 2 depicts an illustrative processor-based, computing device.

FIG. 2 depicts an illustrative processor-based, computing device 200. The computing device 200 can implement a position and corrosion determination technique or run an application or software related to the position and corrosion determination technique, as described above with respect to FIG. 1. The computing device 200 is representative of the type of computing device that can be present in or used in conjunction with at least some aspects of the processor-based device 112 of FIG. 1 and/or other devices at least partially implementing functionality or techniques described with respect to the system 100 of FIG. 1. The computing device 200 is illustrative only and does not exclude the possibility of another processor- or controller-based system being used in or with any of the aforementioned aspects of the processor-based device 112.

In one aspect, the computing device 200 can include one or more hardware and/or software components configured to execute software programs, such as software for obtaining, storing, processing, and analyzing signals, data, or both. For example, the computing device 200 can include one or more hardware components such as, for example, a processor 205, a random-access memory (RAM) 210, a read-only memory (ROM) 220, a storage 230, a database 240, one or more input/output (I/O) modules 250, and an interface 260. Alternatively, and/or additionally, the computing device 200 can include one or more software components such as, for example, a computer-readable medium including computer-executable instructions for performing techniques or implement functions of tools consistent for the position and corrosion determination. It is contemplated that one or more of the hardware components listed above can be implemented using software. For example, the storage 230 can include a software partition associated with one or more other hardware components of the computing device 200. The computing device 200 can include additional, fewer, and/or different components than those listed above. It is understood that the components listed above are illustrative only and not intended to be limiting or exclude suitable alternatives or additional components.

The processor 205 can include one or more processors, each configured to execute instructions and process data to perform one or more functions associated with the computing device 200. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 2, the processor 205 can be communicatively coupled to the RAM 210, the ROM 220, the storage 230, the database 240, the I/O module 250, and the interface 260. The processor 205 can be configured to execute sequences of computer program instructions to perform various processes (for example, techniques), such as those described herein for automating prior authorizations. The computer program instructions can be loaded into the RAM 210 for execution by the processor 205.

The RAM 210 and the ROM 220 can each include one or more devices for storing information associated with an operation of the computing device 200 and/or the processor 205. For example, the ROM 220 can include a memory device configured to access and store information associated with the computing device 200, including information for identifying, initializing, and monitoring the operation of one or more components and subsystems of the computing device 200. The RAM 210 can include a memory device for storing data associated with one or more operations of the processor 205. For example, the ROM 220 can load instructions into the RAM 210 for execution by the processor 205.

The storage 230 can include any type of storage device configured to store information that the processor 205 can use to perform processes consistent with the disclosed implementations. The database 240 can include one or more software and/or hardware components that cooperate to store, organize, sort, filter, and/or arrange data used by the computing device 200 and/or the processor 205. For example, the database 240 can include end-user profile information, historical activity and end-user specific information, predetermined menu/display options, and other end-user related data. Alternatively, the database 240 can store additional and/or different information. The database 240 can be used to store sensor data from the one or more sensors 110 and any data related to determination of the position of the pipeline tool 106 (or component(s) thereof) and the corrosion of the wellbore tubular 104 or the pipe, as described above.

The I/O module 250 can include one or more components configured to communicate information with a user associated with the computing device 200. For example, the I/O module 250 can include one or more buttons, switches, or touchscreens to allow a user to input parameters associated with the computing device 200. The I/O module 250 can also include a display including a graphical user interface (GUI) and/or one or more light sources for outputting information to the user. The I/O module 250 can also include one or more communication channels for connecting the computing device 200 to one or more secondary or peripheral devices such as, for example, a desktop computer, a laptop, a tablet, a smart phone, a flash drive, or a printer, to allow a user to input data to or output data from the computing device 200.

The Interface 260 can include one or more components configured to transmit and receive data via a communication network, such as the Internet, a local area network, a workstation peer-to-peer network, a direct link network, a wireless network, or any other suitable communication channel. For example, the interface 260 can include one or more modulators, demodulators, multiplexers, demultiplexers, network communication devices, wireless devices, antennas, modems, and any other type of device configured to enable data communication via a communication network.

Figure 3:
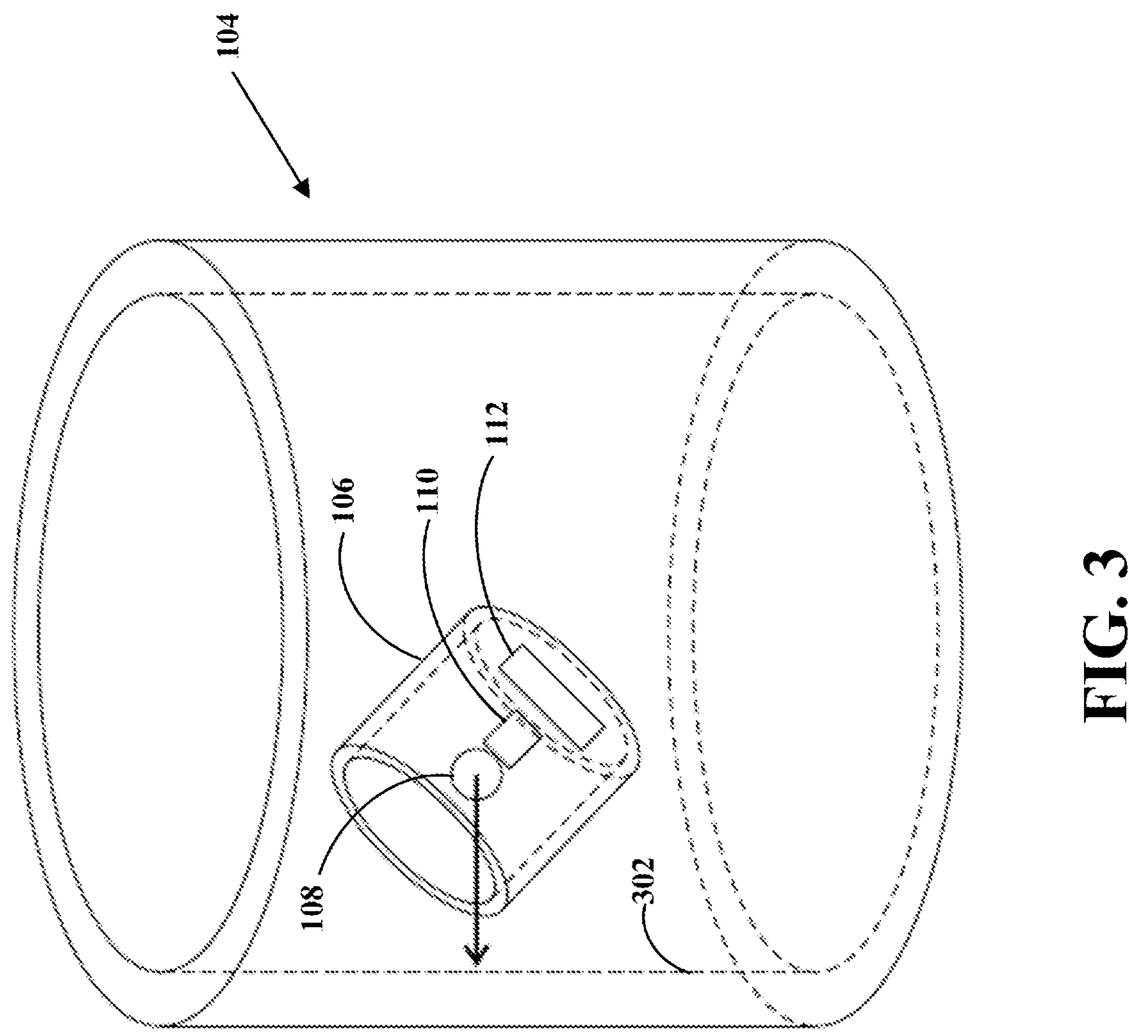
FIG. 3 depicts an example of a pipeline tool within a wellbore tubular or a pipe.

FIG. 3 depicts an example of the pipeline tool 106 that is within the wellbore tubular 104 or a pipe. As described above with respect to discussion of FIG. 1, a position of the pipeline tool 106 (or component(s) such as the magnet 108) can be determined based on force(s) of attraction between the magnet 108 and a pipe or wellbore tubular wall 302 (for example, wall of the wellbore tubular 104 or the pipe). For example, force(s) of attraction (for example, shown by arrow in FIG. 3) can be measured or detected by the one or more sensors 110. Moreover, for example, based on equation (1), a distance between (i) the pipeline tool 106 (or component(s) thereof such as the magnet 108) and (ii) the pipe or wellbore tubular wall 302 within a cross-section of the pipe or the wellbore tubular 104 can be determined.

Figure 4:
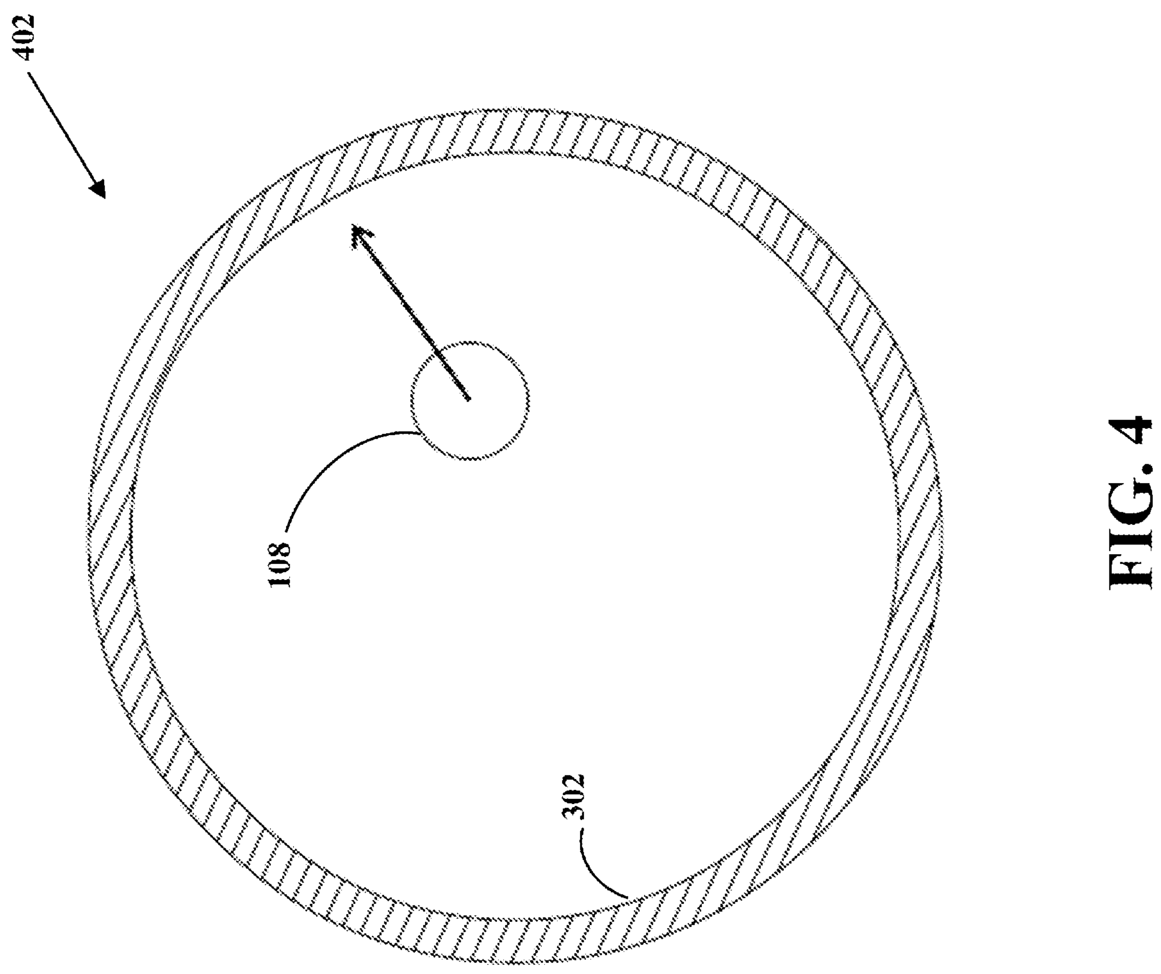
FIG. 4 depicts an example of a cross-section of a wellbore tubular or a pipe.

For example, FIG. 4 depicts an example of a cross-section 402 (for example, the cross-section discussed above) of the wellbore tubular 104 or the pipe. Moreover, FIG. 4 depicts the position of the magnet 108 within the cross-section 402.

Determining the position of the magnet 108 includes determining a coordinate (for example, x-y coordinate) of the magnet 108 within the cross-section 402.

FIG. 5 depicts an example of determining a corrosion at the wellbore tubular 104 or a pipe. As the pipeline tool 106 traverses in a vertical direction 502 (for example, vehicle direction) and the magnet 108 generates force(s) of attraction between the pipe or wellbore tubular wall 302 and the magnet 108. As described above, determining a damage or a corrosion 504 at the wellbore tubular 104 or the pipe includes, based on the pipeline tool 106 traversing within the wellbore, determining a discrepancy 506 of the force of attraction over a time period. For example, as the pipeline tool 106 (for example, the pipe pig or the tractor) traverses or explores within the wellbore tubular 104 or the pipe over the certain time period, the pipeline tool 106 or the magnet 108 can be kept at a same or similar position within a specific cross-sectional location of the wellbore tubular 104 or the pipe, meaning that the specific position of the pipeline tool 106 or the magnet 108 over multiple cross-sections of the wellbore tubular 104 or the pipe can be maintained over the certain time period. For example, the specific position of the pipeline tool 106 can be maintained while the pipeline tool 106 rides or traverses on the wall, by using wheels to ride on the wall, fixed frame of the wall, or some other conveyance to maintain cross sectional position.

For example, over the certain time period, the position of the pipe within the specific cross-sectional location and the force(s) of attraction can remain constant over the certain time period with allowable level of deviation (for example, threshold deviation). Within the certain time period, if there is an indication that the force of attraction falls outside the threshold deviation or noticeable changes or the discrepancy 506 is detected, such indication can correspond to the damage or the corrosion at the wellbore tubular 104 or the pipe.

In some implementations, determining the discrepancy can include plotting a graph 508 of force relative to a vertical position (for example, in the vertical direction 502) of the pipeline tool 106 within the wellbore or time.

Moreover, in response to or after such indication is determined or detected, then the processor-based device 112 or the outside device that is in data communication with the processor-based device 112 can generate a warning or an indication regarding the discrepancy, the damage, or the corrosion. In some implementations, such warning or the indication can be output to a display of the outside device, as described above.

Figure 6:
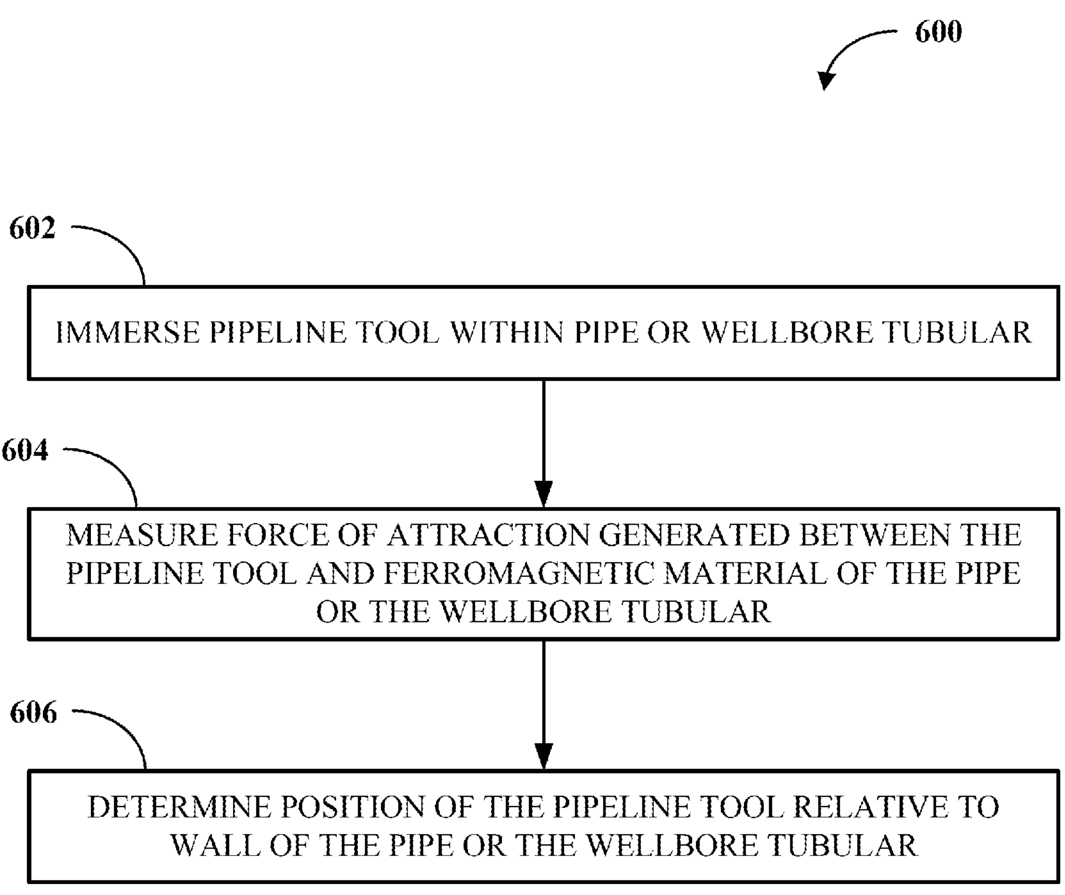
FIG. 6 is a flowchart of a technique for determining a position of a pipeline tool within a wellbore tubular or a pipe.

FIG. 6 is a flowchart of a technique 600 for determining a position of a pipeline tool within a wellbore tubular or a pipe. The technique 600 can be implemented in conjunction with the system 100 and the implementations described above.

At 602, a pipeline tool (for example, the pipeline tool 106) is immersed within a pipe (for example, tubular conduit) or a wellbore tubular (for example, the wellbore tubular 104). For example, the pipeline tool can include or be equipped with a magnet (for example, the magnet 108), one or more sensors (for example, the one or more sensors 110), and a processor-based device (for example, the processor-based device). For example, the pipeline tool can be controlled by, or controlled based on, an external device (for example, a control system) located outside the wellbore or above a ground. For example, the external device can be the outside device that is described above with respect to the discussion of FIG. 1. For example, the external device can be connected to the pipeline tool. For example, such external device can be in data communication with the device (or the processor-based device of the device) through wireless connection or wired connection (for example, cable). For example, the pipeline tool can traverse or can be controlled to traverse within the pipe or the wellbore tubular.

At 604, force(s) of attraction generated between a position of the pipeline tool and a wall of the pipe, or the wellbore tubular, is measured. For example, the wall can include or correspond to a radial surface of the pipe or the wellbore tubular. For example, as the pipeline tool traverses within the pipe or the wellbore tubular, the force(s) of attraction between the magnet and ferromagnetic material of the wellbore tubular or the pipe can be generated, and the one or more sensors can measure the force(s) of attraction. For example, the one or more sensors can be configured to measure the force(s) of attraction in multiple directions. For example, the one or more sensors can be a multi-axis force sensor that can detect or measure the forces of attraction or torque in multiple axis (for example, X, Y, and Z axis) or directions. In some implementations, in addition to the multi-axis force sensor, the one or more sensors can further include an accelerometer to fully capture or determine a motion of the pipeline tool or identify a global z direction of forces of attraction based on a gravity pulling the magnet. For example, the accelerometer can measure acceleration in multiple directions, and can detect the acceleration vector due to gravity. Although the accelerometer alone may not provide how far the pipeline tool is from the pipe wall, the combination of these sensors can determine or provide, not only a position of the pipeline tool within a cross-section of the pipe, but also an orientation of the pipeline tool. This capturing or determination of the motion of the pipeline tool is beneficial in tracking what the pipeline tool was doing in the pipe, for example, whether it has been oscillating or wobbling, or dragging along the pipe wall.

At 606, the position of the pipeline tool relative to the wall (of the pipe or the wellbore tubular) is determined. For example, a position of the pipeline tool within the cross-section of the pipe relative to the wall can be determined.

For example, determining the position of the pipeline tool can include determining, based on the force of attraction, a distance from the pipeline tool (or component(s) thereof such as the magnet) to the wall. For example, determining the position of the pipeline tool can include determining, based on a correlation between the force of attraction, a radius of the cross-section, and a type of the magnet, the distance from the pipeline tool to the wall. For example, determining the position of the pipeline tool can include determining, based on the equation (1) described above, the distance from the pipeline tool to the wall. For example, the position of the pipeline tool can correspond to an x-y coordinate of the cross-section.

Moreover, after or in response to the position of the pipeline tool being determined, such position can be output to the processor-based device, or to the external device that is in data communication with the processor-based device. In some implementations, data associated with the position can be stored in a memory of the processor-based device or the external device.

Figure 7:
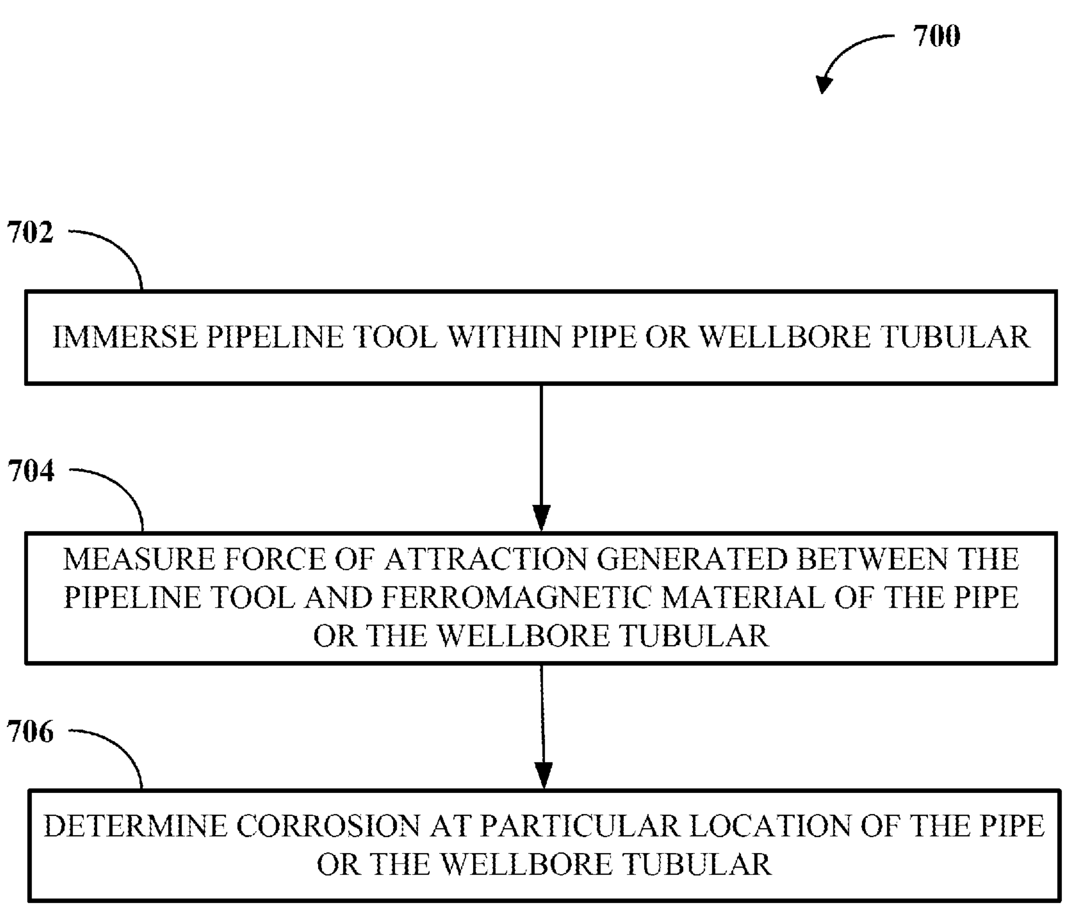
FIG. 7 is a flowchart of a technique for determining a corrosion or a damage at a wellbore tubular or a pipe.

FIG. 7 is a flowchart of a technique 700 for determining a damage or a corrosion within a wellbore tubular or a pipe. The technique 700 can be implemented in conjunction with the system 100, the technique 600, and the implementations described above.

At 702, a pipeline tool (for example, the pipeline tool 106) is immersed within a pipe (for example, tubular conduit) or a wellbore tubular (for example, the wellbore tubular 104).

Since the step used here can be the same as described with respect to step 602 of FIG. 6, description of the step is not repeated here.

At 704, force(s) of attraction generated between a position of the pipeline tool and a wall of the pipe, or the wellbore tubular is measured. Since the step used here can be the same as described with respect to step 604 of FIG. 6, description of the step is not repeated here.

At 706, a damage or a corrosion at the pipe or the wellbore tubular is determined. For example, determining the damage or the corrosion can include, based on the pipeline tool traversing within the wellbore tubular or the pipe within the wellbore, determining a discrepancy (for example, the discrepancy 506) of the force(s) of attraction over a time period. For example, as the pipeline tool (for example, the pipe pig or the tractor) traverses or explores within the wellbore tubular or the pipe over a certain time period, the magnet or the pipeline tool can be kept within a specific cross-sectional location of the wellbore tubular or the pipe, meaning that a specific position of the magnet or the pipeline tool over multiple cross-sections of the wellbore tubular or the pipe can be maintained over the certain time period. For example, over the certain time period, the position of the pipe within the specific cross-sectional location and the force(s) of attraction can remain constant over the certain time period with allowable level of deviation (for example, threshold deviation). Within the certain time period, if there is an indication that the force(s) of attraction falls outside the deviation threshold or noticeable changes or the discrepancy is detected, such indication can correspond to the damage or the corrosion at the wellbore tubular or the pipe. For example, determining the discrepancy (for example, the discrepancy 506) can include plotting a graph (for example, the graph 508) of force relative to a vertical position of the pipeline tool within the wellbore or time.

Moreover, in response to or after such indication is determined or detected, then the processor-based device or an external device (for example, the outside device) that is in data communication with a processor-based device of the pipeline tool can generate a warning or an indication regarding the discrepancy, the damage, or the corrosion. In some implementations, such warning or the indication can be output to a display of the external device.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading can occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A pipeline tool, comprising:

a body;

a magnet disposed at the body;

one or more sensors disposed at the body and configured to measure at least one force of attraction generated between the magnet and a ferromagnetic material of a tubular conduit; and a controller disposed at the body and configured to perform operations comprising determining, based on the force of attraction, a position of the pipeline tool within a cross-section of the tubular conduit relative to a wall of the tubular conduit within the cross-section.

2. The pipeline tool of claim 1, wherein the magnet and the controller are detachably mounted to the body.

3. The pipeline tool of claim 1, wherein the one or more sensors is configured to measure the force of attraction in a plurality of directions, and the operations comprise determining the position of the pipeline tool based on the force of attraction in the plurality of directions.

4. The pipeline tool of claim 1, wherein the operation of determining the position of the pipeline tool comprises:

determining, based on the force of attraction, a distance of the body from a radial surface of the tubular conduit.

5. The pipeline tool of claim 1, wherein the operation of determining the position of the pipeline tool comprises:

determining, based on a correlation of (i) the force of attraction, (ii) a radius of the cross-section, and (iii) a type of the magnet, a distance of the body from a radial surface of the tubular conduit.

6. The pipeline tool of claim 5, wherein the operation of determining the distance of the body from the radial surface of the tubular conduit comprises:

determining, based on an equation:

$$F = \frac{c}{d^2},$$

the distance of the body from the radial surface of the tubular conduit, wherein F corresponds to the force of attraction, c corresponds to a coupling constant correlated with at least the type of the magnet and the radius of the cross-section, and d corresponds to the distance of the body from the radial surface of the tubular conduit.

7. The pipeline tool of claim 1, wherein the position of the pipeline tool corresponds to an x-y coordinate of the cross-section.

8. The pipeline tool of claim 1, wherein the operations comprise determining, based on the force of attraction, a corrosion at a particular location of the tubular conduit.

9. The pipeline tool of claim 8, wherein the operation of determining the corrosion comprises determining, based on the pipeline tool traversing within the tubular conduit, a discrepancy of the force of attraction over a time period.

10. The pipeline tool of claim 9, wherein the operation of determining the discrepancy of the force of attraction over the time period comprises:

plotting a graph of force relative to at least one of (i) a vertical position of the pipeline tool within the tubular conduit or (ii) a time.

11. The pipeline tool of claim 9, wherein the operations comprise:

communicating data with a control system located outside the tubular conduit, the control system configured to output a warning responsive to determination of the corrosion.

12. A method comprising:

measuring, by a pipeline tool equipped with a magnet and one or more sensors, at least one force of attraction generated between the magnet and ferromagnetic material of a tubular conduit; and determining, based on the force of attraction and by the pipeline tool, a position of the pipeline tool within a cross-section of the tubular conduit relative to a wall of the tubular conduit within the cross-section.

13. The method of claim 12, wherein the one or more sensors is configured to measure the force of attraction in a plurality of directions, and determining the position of the pipeline tool comprises determining the position based on the force of attraction in the plurality of directions.

14. The method of claim 12, wherein determining the position of the pipeline tool comprises:

determining, based on the force of attraction, a distance of the pipeline tool from a radial surface of the tubular conduit.

15. The method of claim 12, wherein determining the position of the pipeline tool comprises:

determining, based on a correlation of (i) the force of attraction, (ii) a radius of the cross-section, and (iii) a type of the magnet, a distance of the pipeline tool from a radial surface of the tubular conduit.

16. The method of claim 15, wherein determining the distance of the pipeline tool from the radial surface of the tubular conduit comprises:

determining, based on an equation $$F = \frac{c}{d^2},$$

the distance of the pipeline tool from the radial surface of the tubular conduit, wherein F corresponds to the force of attraction, c corresponds to coupling constant correlated with at least the type of the magnet and the radius of the cross-section, and d corresponds to the distance of the pipeline tool from the radial surface of the tubular conduit.

17. The method of claim 12, wherein the position of the pipeline tool corresponds to an x-y coordinate of the cross-section.

18. The method of claim 12, further comprising:

determining, based on the force of attraction and by the pipeline tool, a corrosion at a particular location of the tubular conduit.

19. The method of claim 18, wherein determining the corrosion comprises:

based on the pipeline tool traversing within the tubular conduit, determining a discrepancy of the force of attraction over a time period.

20. The method of claim 19, wherein determining the discrepancy of the force of attraction comprises:

plotting a graph of force relative to a vertical position of the pipeline tool within the tubular conduit or time.

* * * * *